United States Patent
Singh

(10) Patent No.: US 12,147,790 B2
(45) Date of Patent: Nov. 19, 2024

(54) SYSTEM AND METHOD FOR AUTOMATICALLY GENERATING AND DEPLOYING GRAPHICAL USER INTERFACE COMPONENTS BASED ON REAL-TIME SKETCHES

(71) Applicant: BANK OF AMERICA CORPORATION, Charlotte, NC (US)

(72) Inventor: Shailendra Singh, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/135,271

(22) Filed: Apr. 17, 2023

(65) Prior Publication Data

US 2024/0345813 A1    Oct. 17, 2024

(51) Int. Cl.

| | |
|---|---|
| G06F 3/048 | (2013.01) |
| G06F 3/0482 | (2013.01) |
| G06F 3/0484 | (2022.01) |
| G06F 8/38 | (2018.01) |
| G06F 11/36 | (2006.01) |
| G06T 11/20 | (2006.01) |

(52) U.S. Cl.
CPC .............. *G06F 8/38* (2013.01); *G06F 3/0482* (2013.01); *G06F 3/0484* (2013.01); *G06F 11/3664* (2013.01); *G06T 11/203* (2013.01); *G06T 2200/24* (2013.01)

(58) Field of Classification Search
CPC ................................................ G06F 3/048–05
See application file for complete search history.

(56) References Cited

U.S. PATENT DOCUMENTS

| | | | |
|---|---|---|---|
| 5,570,281 A | * | 10/1996 | Berry ........................ G06F 8/38 715/835 |
| 6,297,820 B1 | | 10/2001 | Bloem et al. |
| 9,152,297 B2 | | 10/2015 | Sokolsky et al. |
| 9,195,362 B2 | | 11/2015 | Lewin et al. |
| 10,740,072 B2 | | 8/2020 | Quine |
| 11,221,833 B1 | * | 1/2022 | Huang .................... G06F 9/451 |
| 11,392,659 B2 | | 7/2022 | Jain et al. |
| 11,442,430 B2 | | 9/2022 | De Beus |
| 11,449,313 B2 | | 9/2022 | Jiang et al. |
| 11,526,655 B2 | | 12/2022 | Corwin et al. |

(Continued)

*Primary Examiner* — Daniel Rodriguez
(74) *Attorney, Agent, or Firm* — Moore & Van Allen PLLC; Anoohya Yarlagadda

(57) ABSTRACT

Embodiments of the present invention provide a system for automatically generating and deploying graphical user interface components based on real-time sketches. The system is configured for determining that a user has accessed a sketch application via a user computing device, allowing the user to create one or more sketches in real-time via a user interface of the sketch application, determining that the user has created at least a first sketch, wherein the first sketch is associated with an application, extracting data from the first sketch, mapping the first sketch with a first user interface component based on the data extracted from the first sketch, generating the first user interface component, integrating a first source code of the first user interface component, testing the first user interface component, determining that testing of the first user interface component is successful, and deploying the first user interface component to a real-time environment.

20 Claims, 8 Drawing Sheets

(56) References Cited

U.S. PATENT DOCUMENTS

| | | | |
|---|---|---|---|
| 11,605,187 B1 | 3/2023 | Hasanain et al. | |
| 11,699,019 B2 | 7/2023 | Souche et al. | |
| 2012/0166978 A1* | 6/2012 | Singh | G06F 8/38 |
| | | | 715/762 |
| 2014/0149963 A1* | 5/2014 | Jang | G06F 8/34 |
| | | | 717/107 |
| 2016/0357720 A1* | 12/2016 | Thimbleby | G06F 3/1423 |
| 2017/0102861 A1 | 4/2017 | Redenbach et al. | |
| 2017/0214726 A1* | 7/2017 | Malatesha | G06F 3/1454 |
| 2019/0018660 A1* | 1/2019 | Ananthapur Bache | G06F 8/34 |
| 2019/0317739 A1* | 10/2019 | Turek | G06N 3/045 |
| 2020/0133641 A1 | 4/2020 | Sinn et al. | |
| 2020/0133651 A1 | 4/2020 | Holzer et al. | |
| 2020/0364034 A1* | 11/2020 | Pejoski | G06V 20/70 |
| 2021/0011592 A1* | 1/2021 | Liu | G06F 3/0482 |
| 2021/0150263 A1* | 5/2021 | Corwin | G06F 16/148 |
| 2021/0209239 A1* | 7/2021 | Robinson | G06F 21/6209 |
| 2021/0263963 A1 | 8/2021 | Cho et al. | |
| 2022/0121479 A1 | 4/2022 | Chivukula et al. | |
| 2023/0161563 A1* | 5/2023 | Stump | G06F 3/0482 |
| | | | 717/110 |
| 2023/0409298 A1* | 12/2023 | Ciminelli | G06V 30/422 |

\* cited by examiner

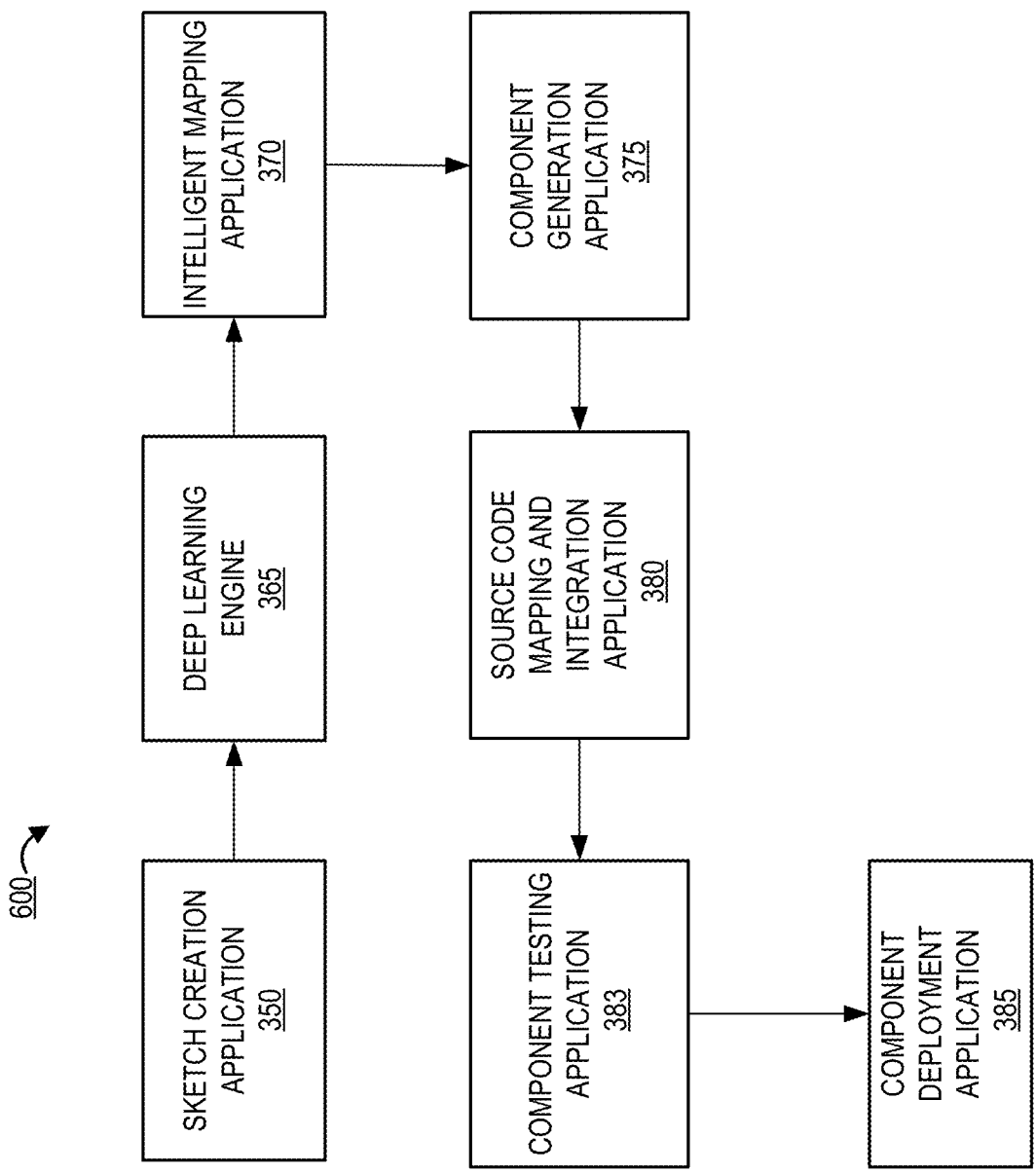

SYSTEM AND METHOD FOR AUTOMATICALLY GENERATING AND DEPLOYING GRAPHICAL USER INTERFACE COMPONENTS BASED ON REAL-TIME SKETCHES

BACKGROUND

There exists a need for a system for automatically generating and deploying graphical user interface components based on real-time sketches.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for automatically generating and deploying graphical user interface components based on real-time sketches. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that a user has accessed a sketch application via a user computing device, allows the user to create one or more sketches in real-time via a user interface of the sketch application, determines that the user has created at least a first sketch, wherein the first sketch is associated with an application, extracts data, via a deep learning engine, from the first sketch, maps the first sketch with a first user interface component based on the data extracted from the first sketch, generates the first user interface component in real-time, maps and integrates a first source code of the first user interface component, tests the first user interface component, determines that testing of the first user interface component is successful, and deploys the first user interface component to a real-time environment.

In some embodiments, the present invention determines suitability, compatibility, and correctness of the first sketch with one or more parameters of the application and provides an input associated with the suitability, compatibility, and correctness of the first sketch.

In some embodiments, the present invention identifies that the user is creating the first sketch, determines that the first user interface component associated with the first sketch already exists, and displays the first user interface component to the user via the sketch application before the user finishes the first sketch.

In some embodiments, the present invention in response to identifying the first sketch, determines that the first sketch is associated with a first action, determines a first set of actions associated with the first action, and displays the first set of actions that can be linked to the first action.

In some embodiments, the present invention allows the user to link at least one action of the first set of actions to the first action, wherein linking the at least one action of the first set of actions comprises linking the first source code associated with the first action with a source code associated with the at least one action.

In some embodiments, the present invention determines that the user has created a second sketch associated with the application, receives a connection from the user that connects the second sketch and the first sketch, and establishes the connection between the first user interface component associated with the first sketch and a second user interface component associated with the second sketch.

In some embodiments, the present invention allows a plurality of users to access the sketch application at a same time and allows the plurality of users to create a collaborative sketch, via the sketch application.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
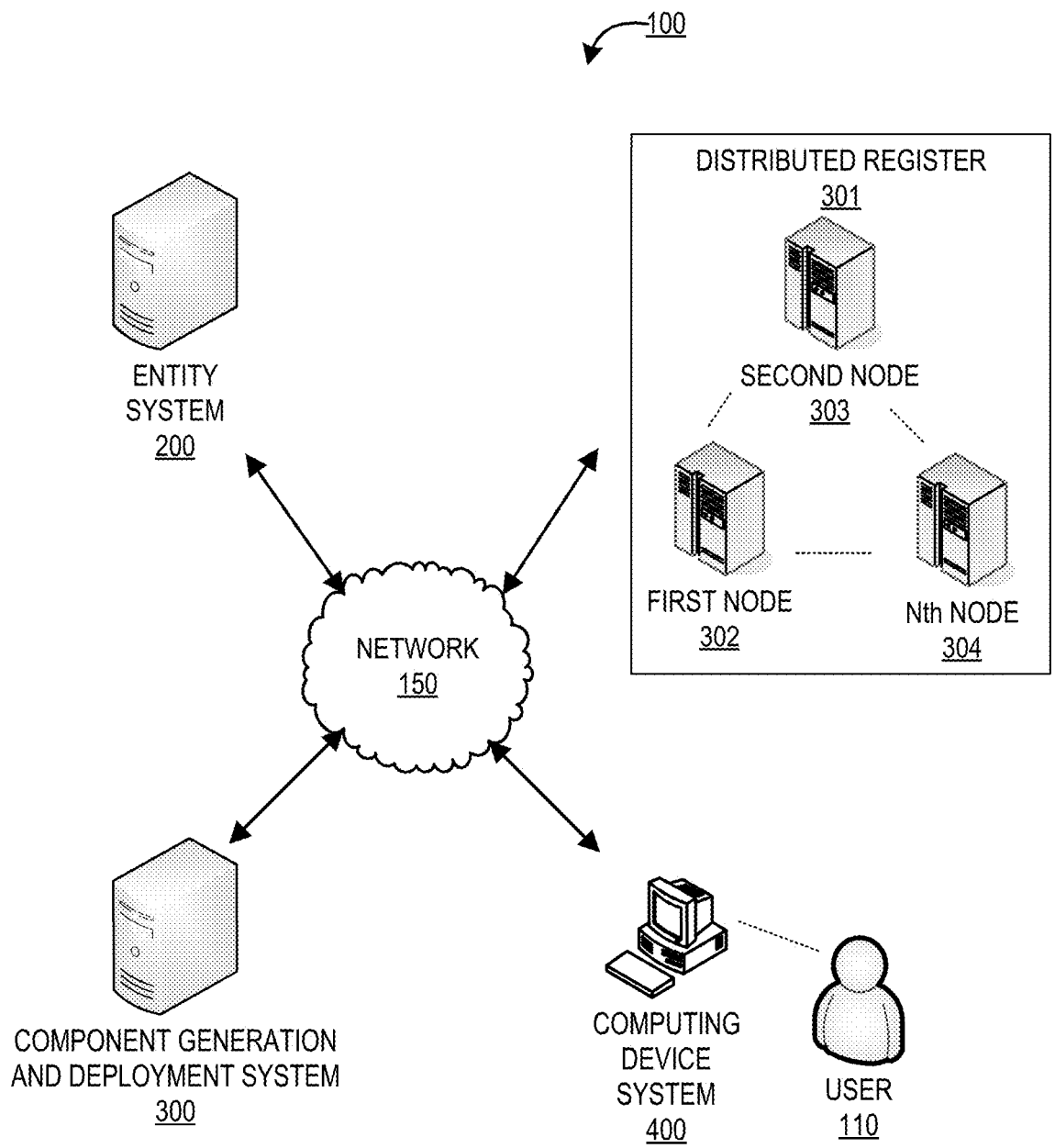
Figure 2:
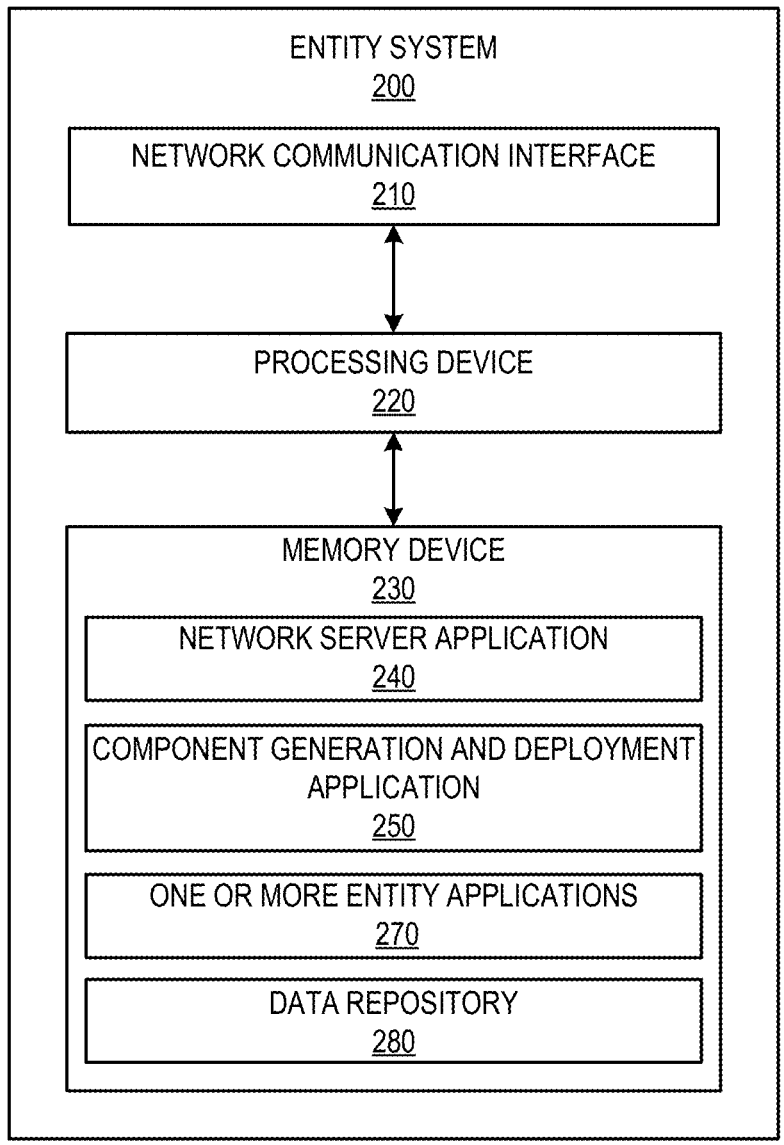
Figure 3:
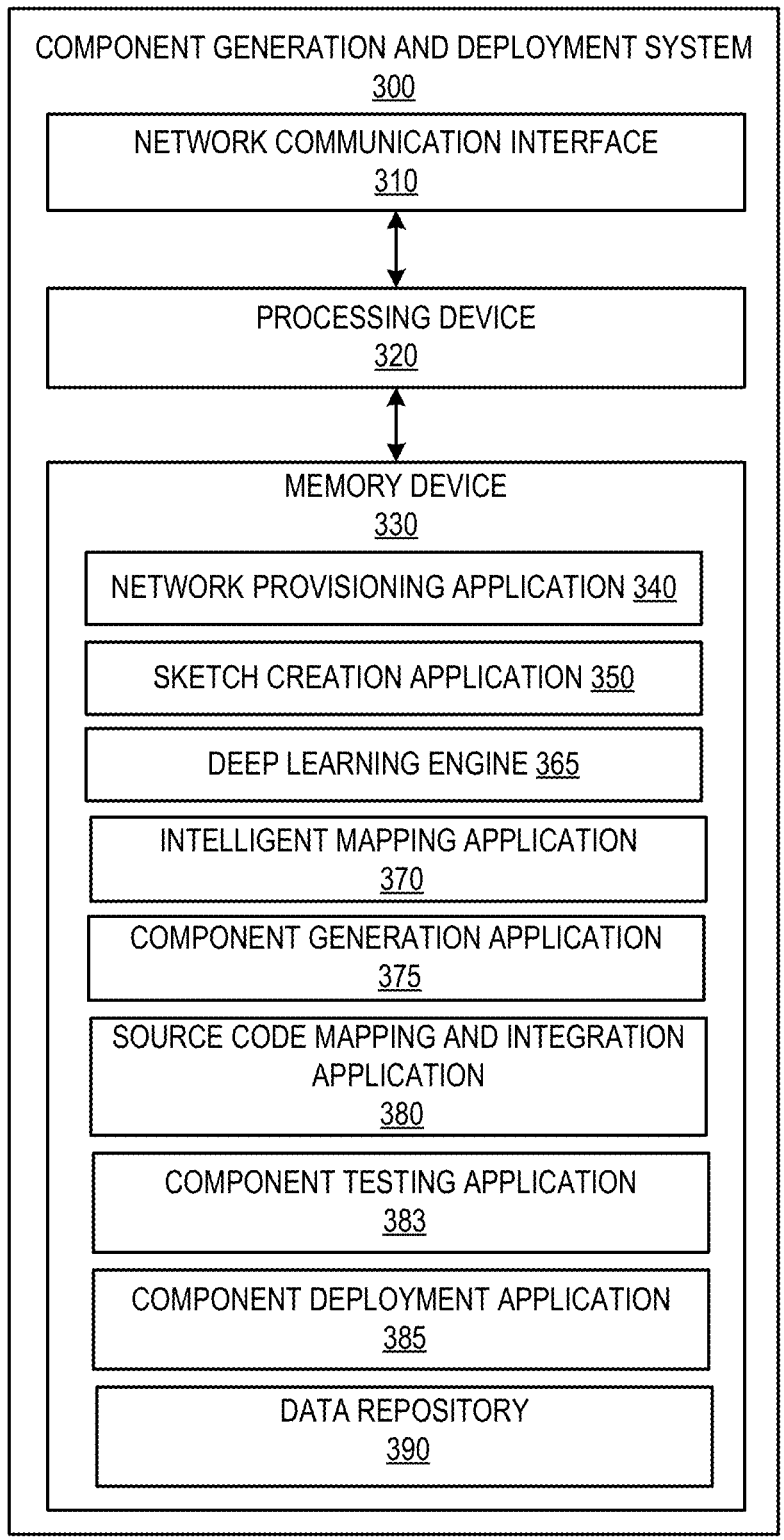
Figure 4:
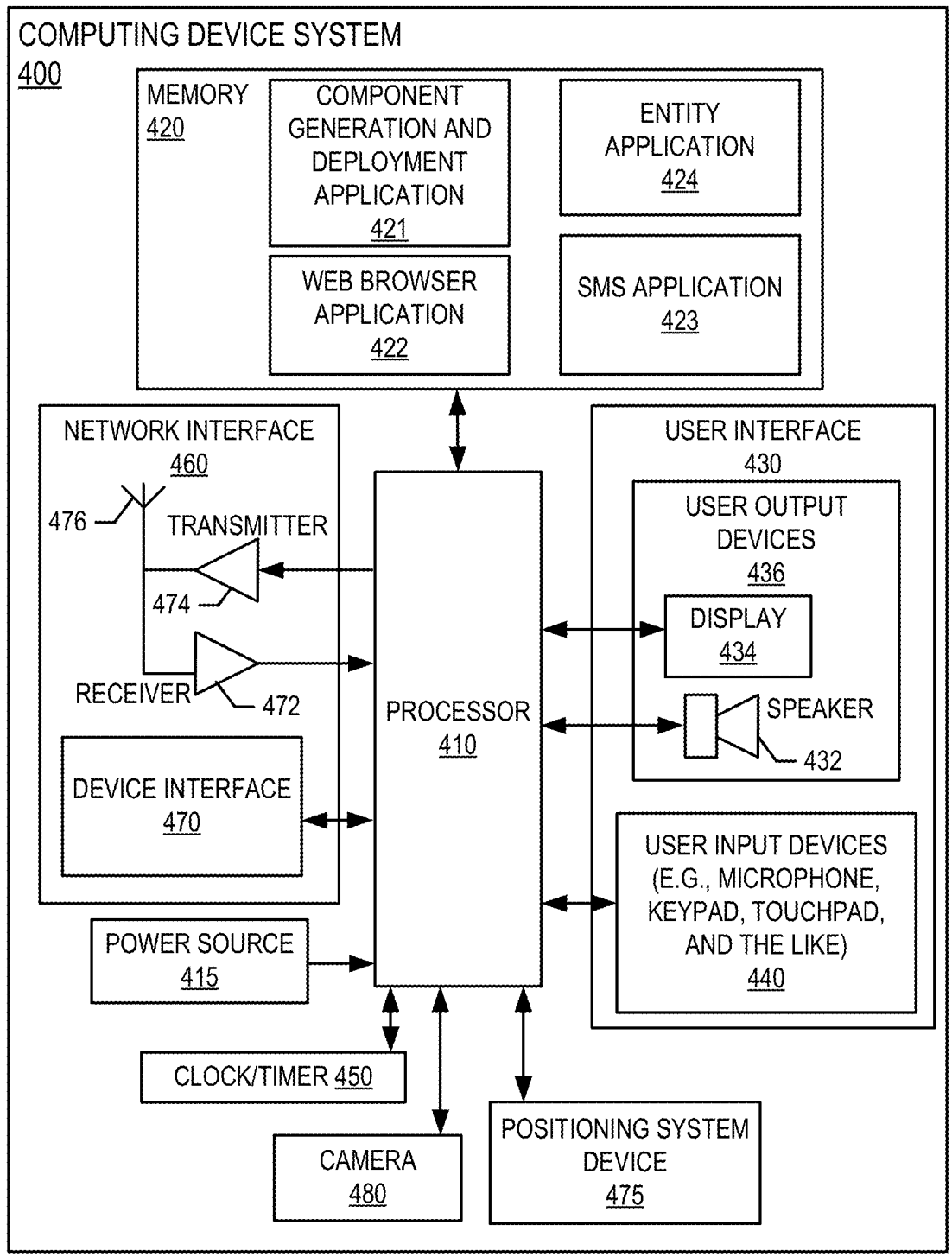
Figure 5:
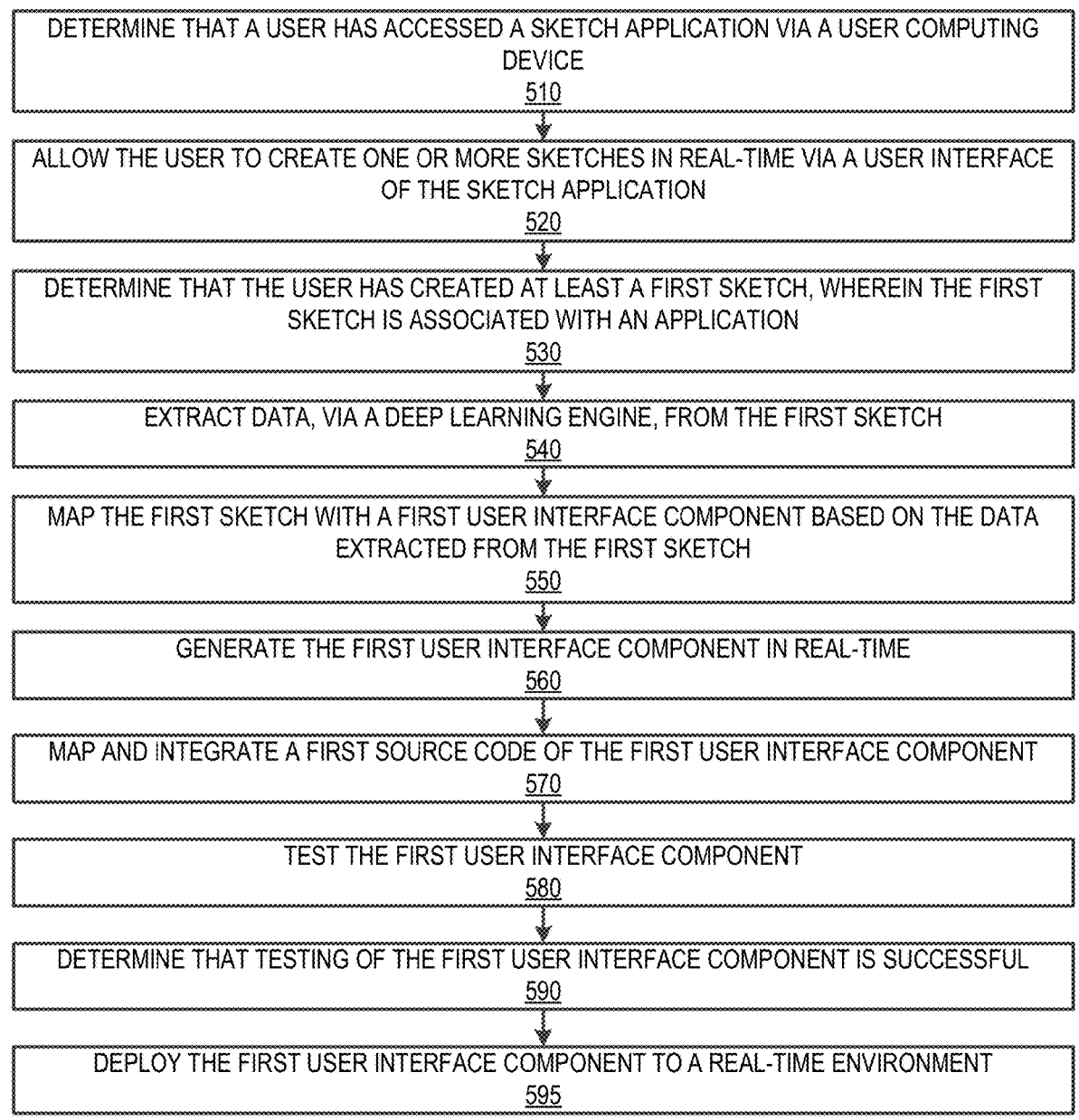
Figure 7A:
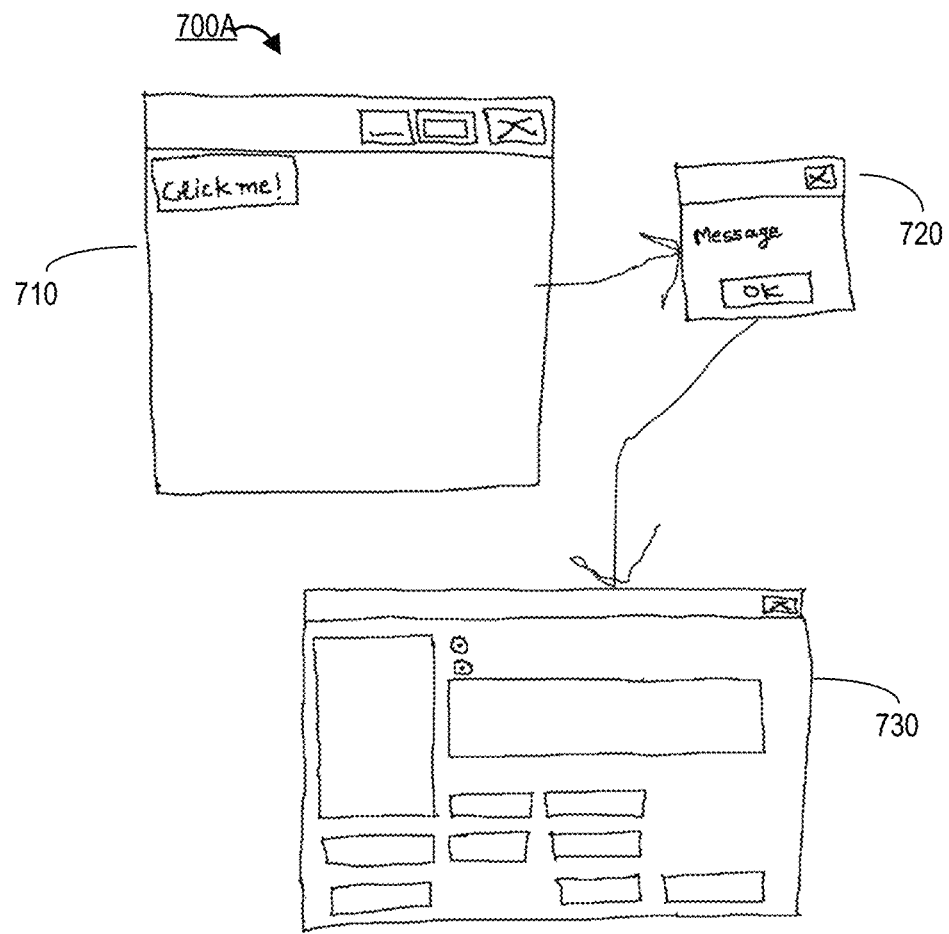
Figure 7B:
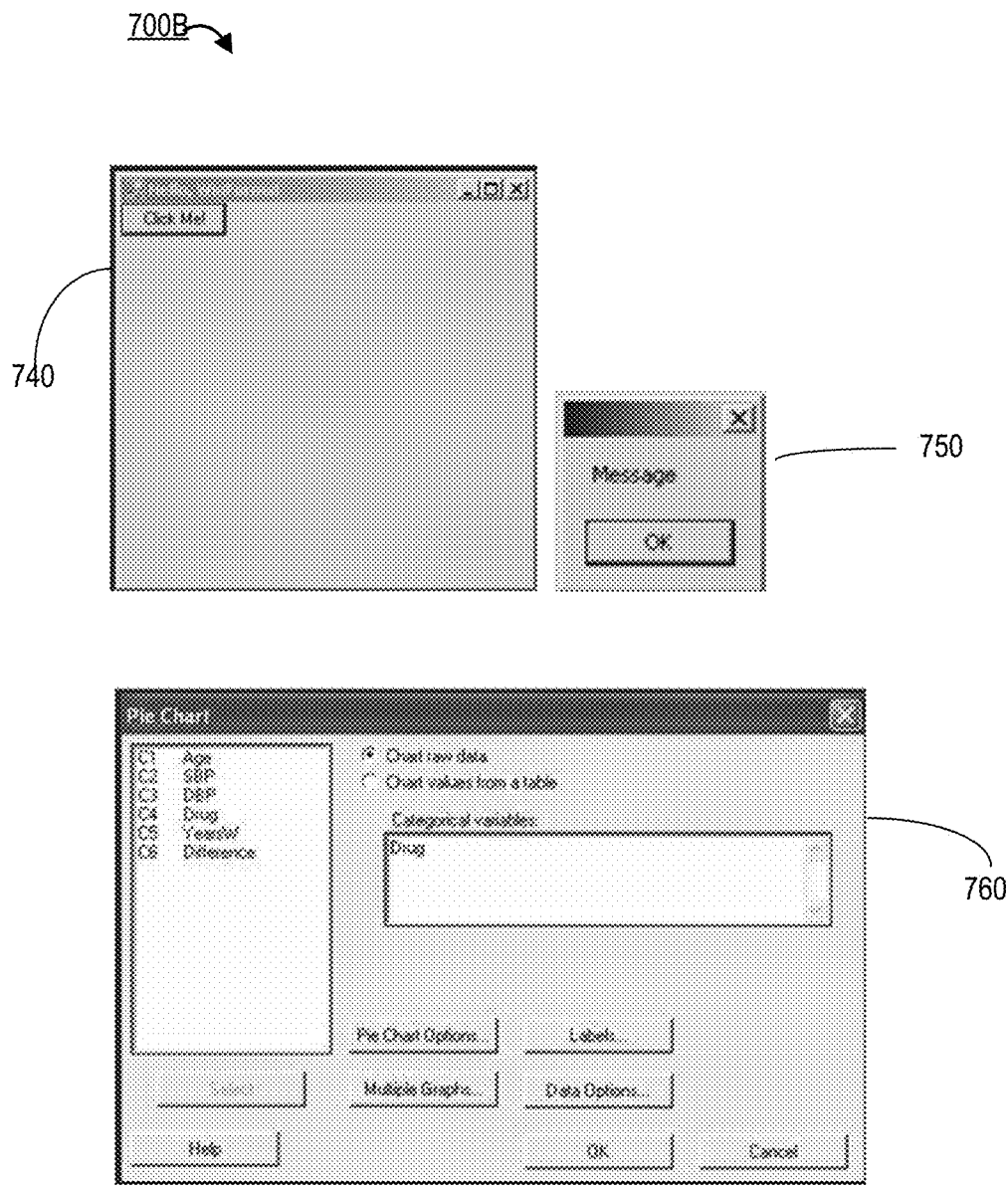

Having thus described embodiments of the invention in general terms, reference will now be made the accompanying drawings, wherein:

FIG. 1 provides a block diagram illustrating a system environment for automatically generating and deploying graphical user interface components based on real-time sketches, in accordance with an embodiment of the invention;

FIG. 2 provides a block diagram illustrating the entity system 200 of FIG. 1, in accordance with an embodiment of the invention;

FIG. 3 provides a block diagram illustrating a component generation and deployment system 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for automatically generating and deploying graphical user interface components based on real-time sketches, in accordance with an embodiment of the invention;

FIG. 6 provides a block diagram illustrating the process of automatically generating and deploying graphical user interface components based on real-time sketches, in accordance with an embodiment of the invention;

FIG. 7A provides a flowchart illustrating a real-time sketch created by a user via a sketch application, in accordance with an embodiment of the invention; and FIG. 7B provides a flowchart illustrating auto-generated user interface components generated based on the real-time sketch created by the user via the sketch application, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that develops, manages, and/or maintains one or more applications for performing one or more organizational activities of the entity. The one or more applications may be any applications that comprise graphical user interfaces that allow users (e.g., employees, customers, potential customers, and/or the like) to provide inputs associated with the organizational activities. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," "linked structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, a pointer (e.g., a hash value) to the previous block in the linked block structure, and/or any additional data created by the system of the present invention. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified. In some embodiments of the present invention, a user may submit data associated with the creation of a new block associated with the linked block structure. For example, a user may initiate a transaction, where the data associated with the transaction is stored in a new block linked with the transaction.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed ledger" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed ledger" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm. In some embodiments of the present invention, the distributed ledger being described herein may be a permissioned distributed ledger. In some embodiments of the present invention, the distributed ledger being described herein may be a private distributed ledger.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

Typically, multiple users have to develop software codes associated with applications, which can be time consuming and moreover, multiple users may end up developing same pieces of code for redundant elements of the applications, thereby reducing the efficiency of software development and integration process. As such, there exists a need for a system that can improve the overall efficiency of the software development and integration process of the applications.

FIG. 1 provides a block diagram illustrating a system environment 100 for automatically generating and deploying graphical user interface components based on real-time sketches, in accordance with an embodiment of the invention. As illustrated in FIG. 1, the environment 100 includes a component generation and deployment system 300, an entity system 200, a distributed register 301, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., system administrators, application developers, application owners, application end users, business analysts, finance agents, or the like) of an entity associated with the entity system 200. In some embodiments, the one or more users 110 may be customers of the entity. In some embodiments, the one or more users 110 may be potential customers of the entity.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more applications to perform one or more organizational activities (e.g., transmission of data).

The component generation and deployment system 300 is a system of the present invention for performing one or more process steps described herein. In some embodiments, the component generation and deployment system 300 may be an independent system. In some embodiments, the component generation and deployment system 300 may be a part of the entity system 200.

In some embodiments, the distributed register 301 comprises one or more nodes (e.g., first node 302, second node 303, through nth node). In some embodiments, the distributed register 301 may be a private distributed register associated with the entity. In some embodiments, the distributed register 301 may be a public distributed register. In some embodiments, one or more of the component generation and deployment system 300, the entity system 200, and the computing device system 400 may be one or more nodes of the distributed register 301.

The component generation and deployment system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the component generation and deployment system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the component generation and deployment system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 is operated by an entity, such as a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a component generation and deployment application 250, one or more entity applications 270, and a data repository 280. The one or more entity applications 270 may be any applications developed, supported, maintained, utilized, and/or controlled by the entity. The computer-executable program code of the network server application 240, the component generation and deployment application 250, the one or more entity application 270 to perform certain logic, data-extraction, and data-storing functions of the entity system 200 described herein, as well as communication functions of the entity system 200.

The network server application 240, the component generation and deployment application 250, and the one or more entity applications 270 are configured to store data in the data repository 280 or to use the data stored in the data repository 280 when communicating through the network communication interface 210 with the component generation and deployment system 300, and/or the computing device system 400 to perform one or more process steps described herein. In some embodiments, the entity system 200 may receive instructions from the component generation and deployment system 300 via the component generation and deployment application 250 to perform certain operations. The component generation and deployment application 250 may be provided by the component generation and deployment system 300. The one or more entity applications 270 may be any of the applications used, created, modified, facilitated, and/or managed by the entity system 200.

FIG. 3 provides a block diagram illustrating the component generation and deployment system 300 in greater detail, in accordance with embodiments of the invention. As illustrated in FIG. 3, in one embodiment of the invention, the component generation and deployment system 300 includes one or more processing devices 320 operatively coupled to a network communication interface 310 and a memory device 330. In certain embodiments, the component generation and deployment system 300 is operated by an entity, such as a financial institution. In some embodiments, the component generation and deployment system 300 is owned or operated by the entity of the entity system 200. In some embodiments, the component generation and deployment system 300 may be an independent system. In alternate embodiments, the component generation and deployment system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the component generation and deployment system 300 described herein. For example, in one embodiment of the component generation and deployment system 300, the memory device 330 includes, but is not limited to, a network provisioning application 340, a sketch creation application 350, a deep learning engine 365, an intelligent mapping application 370, a component generation application 375, a source code mapping and integration application 380, a component testing application 383, a component deployment application 385, and a data repository 390 any data processed or accessed by one or more applications in the memory device 330. The computer-executable program code of the network provisioning application 340, the sketch creation application 350, the deep learning engine 365, the intelligent mapping application 370, the component generation application 375, the source code mapping and integration application 380, the component testing application 383, and the component deployment application 385 may instruct the processing device 320 to perform certain logic, data-processing, and data-storing functions of the component generation and deployment system 300 described herein, as well as communication functions of the component generation and deployment system 300.

The network provisioning application 340, the sketch creation application 350, the deep learning engine 365, the intelligent mapping application 370, the component generation application 375, the source code mapping and integration application 380, the component testing application 383, and the component deployment application 385 are configured to invoke or use the data in the data repository 390 when communicating through the network communication interface 310 with the entity system 200, and/or the computing device system 400. In some embodiments, the network provisioning application 340, the sketch creation application 350, the deep learning engine 365, the intelligent mapping application 370, the component generation application 375, the source code mapping and integration application 380, the component testing application 383, and the component deployment application 385 may store the data extracted or received from the entity system 200, and the computing device system 400 in the data repository 390. In some embodiments, the network provisioning application 340, the sketch creation application 350, the deep learning engine 365, the intelligent mapping application 370, the component generation application 375, the source code mapping and integration application 380, the component testing application 383, and the component deployment application 385 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a component generation and deployment application 421, entity application 424. These applications also typically instructions to a graphical user interface (GUI) on the display 430 that allows the user 110 to interact with the entity system 200, the component generation and deployment system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the component generation and deployment application 421 provided by the component generation and deployment system 300 allows the user 110 to access the component generation and deployment system 300. In some embodiments, the entity application 424 provided by the entity system 200 and the component generation and deployment application 421 allow the user 110 to access the functionalities provided by the component generation and deployment system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for generating signature bits associated with data packets in a network, in accordance with an embodiment of the invention. As shown in block 510, the system determines that a user has accessed a sketch application via a user computing device. The user computing device may be a desktop computer, a tablet, and/or the like as described in FIG. 4. As shown in block 520, the system allows the user to create one or more sketches in real-time via a user interface of the sketch application. The system may continuously monitor the user interface of the sketch application to identify the one or more sketches that are created in real-time by the one or more users comprising the user. The sketch application is an application provided by the system of the present invention to one or more users associated with an entity, where the one or more users use a user interface of the sketch application to create sketches in real-time.

As shown in block 530, the system determines that the user has created at least a first sketch, wherein the first sketch is associated with an application. Based on monitoring the user interface of the sketch application, the system may determine that the user has created at least the first sketch. The application may be any application that is being developed or maintained or managed by the entity for performing one or more organizational activities (e.g., one or more entity applications 270). The first sketch may be any sketch that resembles a user interface component of the application. The one or more sketches created by the user may comprise applications pages, text boxes, connectors (that connect multiple pages, text boxes, or the like of the application), graphical elements, entity logo, styling elements, and/or any other components associated with the application.

In some embodiments, all user interface components of the application may have same styling elements, same logo, same font, same size text boxes, and/or the like. In such embodiments, the system may identify that the user is creating a sketch associated with an application page with a text box, the system may automatically generate the remaining sketch by completing the text box.

In some embodiments, the system identifies that the user is creating the first sketch, determines that the first user interface component associated with the first sketch already exists, and displays the first user interface component to the user via the sketch application before the user finishes the first sketch. For example, the system may determine that the user is creating a form associated with customer loan application, determine that a form already exists for customer loan application, and may display the form that already exists to the user, via the sketch application.

As shown in block 540, the system extracts data, via a deep learning engine, from the first sketch. The deep learning engines may comprise Artificial Intelligence and Machine Learning algorithms like Long Short-Term Memory (LSTM), Convolutional Neural Network (CNN), Generative Adversarial Networks (GAN), and/or the like. The deep learning engine may be trained to identify all data that is provided by the user in the first sketch. For example, as illustrated in FIG. 7A, the deep learning engine may identify that reference '710' is a rectangular box and comprises a 'click me' button, a minimize window button, a maximize window button, and a close button. It should be understood that the examples described herein are for explanatory purposes only.

In some embodiments, the system in response to identifying the first sketch, determines that the first sketch is associated with a first action, determines a first set of actions associated with the first action, and displays the first set of actions that can be linked to the first action. In such embodiments, the system allows the user to link at least one action of the first set of actions to the first action, wherein linking the at least one action of the first set of actions comprises linking the first source code associated with the first action with a source code associated with the at least one action. For example, as illustrated in FIG. 7A, the deep learning engine of the system may determine that reference '710' should be followed by an action of opening another text box '720' and should further be followed by another action as displayed in reference '730.' Upon displaying the first set of actions comprising references '720' and '730', the system may allow the user to link reference '710' with references '720' and '730' without providing any additional sketches. In some embodiments, the deep learning engine may make these determinations based on existing user interface components of the application. In some embodiments, the deep learning engine may make these determinations based on input from a user.

As shown in block 550, the system maps the first sketch with a first user interface component based on the data extracted from the first sketch. Based on the first sketch and the data extracted from the first sketch, the system may identify that the first sketch is associated with the first user interface component. Continuing with the previous example, the system may identify via the deep learning engine that the first sketch is a rectangular box with a minimize window button, a maximize window button, and a close button, and may map the first sketch to a text box of the application. In some such embodiments, the system may map that the first sketch to the first user interface component and may automatically apply one or more common features associated with the application to the first user interface component. For example, the system may map the first sketch to a text box and may apply common features associated with text boxes of the application to the text box created by the user, where the common features may comprise styling elements (e.g., color of the text box, color of header of the text box, color of buttons, and/or the like), font size, font, and/or the like.

As shown in block 560, the system generates the first user interface component in real-time. The system generates the first user interface component based on the first sketch created by the user. For example, as illustrated in FIGS. 7A and 7B, sketch associated with text box sketch 710 is automatically converted into text box 740 associated with an application.

In some embodiments, the system determines suitability, compatibility, and correctness of the first sketch with one or more parameters of the application and provides an input associated with the suitability, compatibility, and correctness of the first sketch. For example, the system may determine that the user is creating a form with different styling elements and may provide an input that the application has standard styling elements and that the styling elements used by the user in the first sketch are not compatible with other user interface components of the application. In some embodiments, the system may automatically correct the first sketch and/or the user interface component generated based on the first sketch based on the one or more parameters. For example, the system may determine that the user has created a circular text box, may further determine that all text boxes of the application are rectangular text boxes, and may automatically generate a rectangular text box user interface component instead of a circular text box to match the one or more parameters of the application.

As shown in block 570, the system maps and integrates a first source code of the first user interface component. The source code may be a program code associated with the first user interface component. The system integrates the first source code of the first user interface component with other user interface components of the application that is being developed. In some embodiments, integrating the first source code comprises establishing connection with other pages or parts of the applications, establishing connections with other applications, establishing database connections, and/or the like. In some embodiments, the system may determine that any of the sketches created by the user require real-time data associated with the application and may present one or more options to the user, where the one or more options represent data sources that are associated with the application. In some embodiments, the system may allow the user to select any one of the options that the user deems appropriate for the first sketch from the one or more options. For example, the system may determine that the text box submitted by the user requires legal names of customers and may determine that the application is connected to database 'X' and database 'Y' where legal names of customers are available and may present the options of database 'X' and database 'Y' to the user. In some embodiments, the system may also generate a recommendation that retrieving data from database 'Y' is faster than retrieving data from database 'X.' In some embodiments, the system may automatically connect to database 'Y' and transmit a notification to the user. In some such embodiments, the system may automatically connect to database 'Y' after receiving an approval from the user.

As shown in block 580, the system tests the first user interface component. The system may perform all tests to check for any errors (e.g., connection errors, or the like). As shown in block 590, the system determines that testing of the first user interface component is successful. As shown in block 595, the system deploys the first user interface component to a real-time environment. Deploying the first user interface component may comprise integrating with any software development integration platforms to automatically deploy the first user interface component. Examples of such software development integration platforms may comprise any available continuous integration and continuous deployment platforms. In some embodiments, the system may employ a distributed register while deploying the first user interface components. In such embodiments, the system may deploy the first user interface component only after receiving consent from other nodes (e.g., user computing systems, entity systems, entity applications, and/or the like) of the distributed register.

In some embodiments, the system determines that the user has created a second sketch associated with the application, receives a connection from the user that connects the second sketch and the first sketch, and establishes the connection between the first user interface component associated with the first sketch and a second user interface component associated with the second sketch. Establishing the connection may comprise automatically generating one or more software codes that generate the connection between the first sketch and the second sketch.

In some embodiments, the system allows a plurality of users to access the sketch application at a same time and also allows the plurality of users to create a collaborative sketch, via the sketch application. For example, multiple users may connect to the sketch application at the same time and may generate a form, where a first user, second user, a third user, and a fourth user of the multiple users create different parts of the form.

FIG. 6 provides a block diagram illustrating the process of automatically generating and deploying graphical user interface components based on real-time sketches, in accordance with an embodiment of the invention. As shown, the sketch creation application 350 may be provided to the one or more users of the entity for creating sketches associated with one or more entity applications in real-time. The deep learning engine 365 may extract data from the sketches created by the one or more users and transmit the data to the intelligent mapping application 370, where the intelligent mapping application 370 maps the sketches with user interface components of the one or more entity applications. Based on mapping the sketches with the user interface components, the component generation application 375 generates the user interface components. The source code mapping and integration application 380 maps and integrates source code of the user interface components with other components, databases, or the like of the application. After successful mapping and integration of source code, the component testing application 383 tests the source code for any errors or compatibility issues. The component deployment application 385 then deploys user interface component into real-time environment based on determining that testing of the source code is successful.

FIG. 7A provides a flowchart illustrating a real-time sketch created by a user via a sketch application, in accordance with an embodiment of the invention. As shown, the real-time sketches created by the user using the sketch application are illustrated in references '710,' '720,' and '730.' FIG. 7B provides a flowchart illustrating auto-generated user interface components generated based on the real-time sketch created by the user via the sketch application, in accordance with an embodiment of the invention. As shown, the system automatically generates user interface components '740,' '750,' and '760' corresponding to the sketches '710,' '720,' and '730'.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for automatically generating and deploying graphical user interface components based on real-time sketches, the system comprising:
   a processing device;
   a non-transitory storage device containing instructions when executed by the processing device, causes the processing device to perform the steps of:
      determine that a user has accessed a sketch application via a user computing device;
      allow the user to create one or more sketches in real-time via a user interface of the sketch application;
      determine that the user has created at least a first sketch, wherein the first sketch is associated with an application;
      extract data, via a deep learning engine, from the first sketch;
      map the first sketch with a first user interface component based on the data extracted from the first sketch;
      generate the first user interface component in real-time;
      map and integrate a first source code of the first user interface component;
      test the first user interface component;
      determine that testing of the first user interface component is successful;
      deploy the first user interface component to a real-time environment;
      determine that the user has created a second sketch associated with the application;
      receive a connection from the user that connects the second sketch and the first sketch; and
      establish the connection between the first user interface component associated with the first sketch and a second user interface component associated with the second sketch.

2. The system of claim 1, wherein executing the instructions further causes the processing device to:
   determine suitability, compatibility, and correctness of the first sketch with one or more parameters of the application; and
   provide an input associated with the suitability, compatibility, and correctness of the first sketch.

3. The system of claim 1, wherein executing the instructions further causes the processing device to:
   identify that the user is creating the first sketch;
   determine that the first user interface component associated with the first sketch already exists; and
   display the first user interface component to the user via the sketch application before the user finishes the first sketch.

4. The system of claim 1, wherein executing the instructions further causes the processing device to:
   in response to identifying the first sketch, determine that the first sketch is associated with a first action;
   determine a first set of actions associated with the first action; and
   display the first set of actions that can be linked to the first action.

5. The system of claim 4, wherein executing the instructions further causes the processing device to allow the user to link at least one action of the first set of actions to the first action, wherein linking the at least one action of the first set of actions comprises linking the first source code associated with the first action with a source code associated with the at least one action.

6. The system of claim 1, wherein executing the instructions further causes the processing device to:
allow a plurality of users to access the sketch application at a same time; and
allow the plurality of users to create a collaborative sketch, via the sketch application.

7. The system of claim 1, wherein executing the instructions further causes the processing device to continuously monitor the user interface of the sketch application to identify the one or more sketches that are created in real-time by the user.

8. A computer program product for automatically generating and deploying graphical user interface components based on real-time sketches, the computer program product comprising a non-transitory computer-readable medium comprising code causing an apparatus to:
determining that a user has accessed a sketch application via a user computing device;
allowing the user to create one or more sketches in real-time via a user interface of the sketch application;
determining that the user has created at least a first sketch, wherein the first sketch is associated with an application;
extracting data, via a deep learning engine, from the first sketch;
mapping the first sketch with a first user interface component based on the data extracted from the first sketch;
generating the first user interface component in real-time;
mapping and integrating a first source code of the first user interface component;
testing the first user interface component;
determining that testing of the first user interface component is successful;
deploying the first user interface component to a real-time environment;
determining that the user has created a second sketch associated with the application;
receiving a connection from the user that connects the second sketch and the first sketch; and
establishing the connection between the first user interface component associated with the first sketch and a second user interface component associated with the second sketch.

9. The computer program product of claim 8, wherein the code further causes the apparatus to:
determine suitability, compatibility, and correctness of the first sketch with one or more parameters of the application; and
provide an input associated with the suitability, compatibility, and correctness of the first sketch.

10. The computer program product of claim 8, wherein the code further causes the apparatus to:
identify that the user is creating the first sketch;
determine that the first user interface component associated with the first sketch already exists; and
display the first user interface component to the user via the sketch application before the user finishes the first sketch.

11. The computer program product of claim 8, wherein the code further causes the apparatus to:
in response to identifying the first sketch, determine that the first sketch is associated with a first action;
determine a first set of actions associated with the first action; and
display the first set of actions that can be linked to the first action.

12. The computer program product of claim 11, wherein the code further causes the apparatus to allow the user to link at least one action of the first set of actions to the first action, wherein linking the at least one action of the first set of actions comprises linking the first source code associated with the first action with a source code associated with the at least one action.

13. The computer program product of claim 8, wherein the code further causes the apparatus to:
allow a plurality of users to access the sketch application at a same time; and
allow the plurality of users to create a collaborative sketch, via the sketch application.

14. A computer implemented method for automatically generating and deploying graphical user interface components based on real-time sketches, wherein the method comprises:
determining that a user has accessed a sketch application via a user computing device;
allowing the user to create one or more sketches in real-time via a user interface of the sketch application;
determining that the user has created at least a first sketch, wherein the first sketch is associated with an application;
extracting data, via a deep learning engine, from the first sketch;
mapping the first sketch with a first user interface component based on the data extracted from the first sketch;
generating the first user interface component in real-time;
mapping and integrating a first source code of the first user interface component;
testing the first user interface component;
determining that testing of the first user interface component is successful; and
deploying the first user interface component to a real-time environment;
determining that the user has created a second sketch associated with the application;
receiving a connection from the user that connects the second sketch and the first sketch; and
establishing the connection between the first user interface component associated with the first sketch and a second user interface component associated with the second sketch.

15. The computer implemented method of claim 14, wherein the method comprises:
determining suitability, compatibility, and correctness of the first sketch with one or more parameters of the application; and
providing an input associated with the suitability, compatibility, and correctness of the first sketch.

16. The computer implemented method of claim 14, wherein the method further comprises:
identifying that the user is creating the first sketch;
determining that the first user interface component associated with the first sketch already exists; and
displaying the first user interface component to the user via the sketch application before the user finishes the first sketch.

17. The computer implemented method of claim 14, wherein the method further comprises:
in response to identifying the first sketch, determining that the first sketch is associated with a first action;
determining a first set of actions associated with the first action; and displaying the first set of actions that can be linked to the first action.

18. The computer implemented method of claim 17, wherein the method comprises allowing the user to link at least one action of the first set of actions to the first action, wherein linking the at least one action of the first set of actions comprises linking the first source code associated with the first action with a source code associated with the at least one action.

19. The computer implemented method of claim 14, wherein the method comprises:
   allowing a plurality of users to access the sketch application at a same time; and
   allowing the plurality of users to create a collaborative sketch, via the sketch application.

20. The computer implemented method of claim 14, wherein the method comprises continuously monitoring the user interface of the sketch application to identify the one or more sketches that are created in real-time by the user.

* * * * *